(12) United States Patent
Purkayastha et al.

(10) Patent No.: US 8,102,823 B2
(45) Date of Patent: Jan. 24, 2012

(54) METHOD AND APPARATUS FOR REPORTING WLAN CAPABILITIES OF DUAL MODE GPRS/WLAN OR UMTS/WLAN WTRU

(75) Inventors: Debashish Purkayastha, Lansdale, PA (US); Kamel M. Shaheen, King of Prussia, PA (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 11/083,125

(22) Filed: Mar. 17, 2005

(65) Prior Publication Data
US 2005/0163089 A1 Jul. 28, 2005

Related U.S. Application Data

(63) Continuation of application No. 10/750,193, filed on Dec. 31, 2003, now Pat. No. 6,940,844.

(60) Provisional application No. 60/512,164, filed on Oct. 17, 2003.

(51) Int. Cl.
*H04W 4/00* (2009.01)
(52) U.S. Cl. ...................................................... 370/338
(58) Field of Classification Search ................ 370/338, 370/401, 352, 328, 400, 341, 349, 329–332, 370/335, 466, 342, 353, 395, 350, 252, 452, 370/348, 444, 228; 455/465, 432, 555, 426, 455/554, 560, 406, 525, 552, 435, 517, 558, 455/455, 443, 456, 445, 466, 532, 4, 553, 455/450–453, 411, 410, 404, 442, 444, 440, 455/168, 186, 434, 403, 414, 67, 187, 198, 455/436–439, 433, 90, 464, 522, 419, 423, 455/567; 709/200, 206, 217, 207, 332, 230, 709/231, 401, 335, 220, 222–225; 713/200; 705/64

See application file for complete search history.

(56) References Cited

U.S. PATENT DOCUMENTS

| | | | |
|---|---|---|---|
| 5,267,244 A | 11/1993 | Messerschmitt | |
| 5,826,188 A * | 10/1998 | Tayloe et al. | 455/428 |
| 5,963,869 A * | 10/1999 | Fehnel | 455/511 |
| 6,243,581 B1 * | 6/2001 | Jawanda | 455/432.2 |
| 6,400,946 B1 * | 6/2002 | Vazvan et al. | 455/432.1 |
| 6,463,463 B1 * | 10/2002 | Godfrey et al. | 709/206 |

(Continued)

FOREIGN PATENT DOCUMENTS
EP 0 891 047 1/1999
(Continued)

OTHER PUBLICATIONS

3GPP, "3rd Generation Partnership Project; Technical Specification Group Core Network; Mobile Radio Interface Layer 3 Specification; Core Network Protocols; Stage 3 (Release 1999)", 3GPP TS 24.008, V3.17.0 (Sep. 2003).

(Continued)

*Primary Examiner* — Hassan Phillips
*Assistant Examiner* — Prenell P Jones
(74) *Attorney, Agent, or Firm* — Volpe and Koenig, P.C.

(57) ABSTRACT

Method and apparatus for enabling a wireless terminal to communicate the dual-mode capabilities and reporting the interworking capabilities of the two networks with which the wireless terminal have the added capability of obtaining services from either one of the interworking networks.

14 Claims, 8 Drawing Sheets

U.S. PATENT DOCUMENTS

| | | | |
|---|---|---|---|
| 6,621,793 | B2 | 9/2003 | Widegren et al. |
| 6,625,135 | B1* | 9/2003 | Johnson et al. ............... 370/332 |
| 6,658,011 | B1 | 12/2003 | Sevanto et al. |
| 6,714,526 | B2 | 3/2004 | Wei et al. |
| 6,748,234 | B1 | 6/2004 | Agrawal et al. |
| 6,771,964 | B1* | 8/2004 | Einola et al. ................... 455/437 |
| 6,785,535 | B2 | 8/2004 | Lucidarme et al. |
| 6,788,676 | B2 | 9/2004 | Partanen et al. |
| 6,853,628 | B2 | 2/2005 | Chitrapu |
| 6,879,584 | B2* | 4/2005 | Thro et al. .................... 370/352 |
| 6,879,600 | B1* | 4/2005 | Jones et al. ................... 370/466 |
| 6,934,752 | B1* | 8/2005 | Gubbi ........................... 709/225 |
| 6,980,801 | B1* | 12/2005 | Soininen et al. ........... 455/435.1 |
| 7,031,703 | B1 | 4/2006 | Graf et al. |
| 7,089,005 | B2 | 8/2006 | Reddy |
| 7,133,384 | B2 | 11/2006 | Park et al. |
| 7,299,046 | B1* | 11/2007 | Ozugur et al. ................ 455/439 |
| 2002/0032751 | A1* | 3/2002 | Bharadwaj .................... 709/218 |
| 2002/0085516 | A1* | 7/2002 | Bridgelall ..................... 370/329 |
| 2002/0101858 | A1 | 8/2002 | Stuart et al. |
| 2002/0137534 | A1* | 9/2002 | Thandu ......................... 455/517 |
| 2002/0151325 | A1* | 10/2002 | Fitton et al. ................... 455/553 |
| 2003/0014521 | A1* | 1/2003 | Elson et al. ................... 709/225 |
| 2003/0031160 | A1* | 2/2003 | Gibson Ang et al. ......... 370/349 |
| 2003/0095522 | A1* | 5/2003 | Korus et al. ................... 370/338 |
| 2003/0134650 | A1* | 7/2003 | Sundar et al. ................. 455/465 |
| 2003/0176195 | A1 | 9/2003 | Dick et al. |
| 2004/0008650 | A1* | 1/2004 | Le et al. ........................ 370/338 |
| 2004/0087307 | A1* | 5/2004 | Ibe et al. ....................... 455/436 |
| 2004/0116140 | A1* | 6/2004 | Babbar et al. ................. 455/517 |
| 2004/0120277 | A1* | 6/2004 | Holur et al. ................... 370/328 |
| 2004/0148352 | A1* | 7/2004 | Menon et al. ................. 709/205 |
| 2004/0156329 | A1* | 8/2004 | Bck et al. ...................... 370/328 |
| 2004/0176059 | A1* | 9/2004 | Hayem et al. .............. 455/168.1 |
| 2004/0190468 | A1* | 9/2004 | Saijonmaa .................... 370/312 |
| 2004/0203593 | A1* | 10/2004 | Whelan et al. ................ 455/411 |
| 2004/0203792 | A1* | 10/2004 | Shaheen et al. ............... 455/444 |
| 2005/0002407 | A1* | 1/2005 | Shaheen et al. ............... 370/401 |
| 2005/0003804 | A1* | 1/2005 | Huomo et al. ............. 455/414.1 |
| 2005/0004968 | A1* | 1/2005 | Mononen et al. ............. 709/200 |
| 2005/0013245 | A1* | 1/2005 | Sreemanthula et al. ...... 370/229 |
| 2005/0025164 | A1* | 2/2005 | Kavanagh et al. ............ 370/401 |
| 2005/0026616 | A1* | 2/2005 | Cavalli et al. ................. 455/436 |
| 2005/0054308 | A1 | 3/2005 | Vayrynen et al. |
| 2005/0058125 | A1* | 3/2005 | Mutikainen et al. .......... 370/354 |
| 2005/0059398 | A1* | 3/2005 | Jaupitre et al. ............. 455/435.2 |
| 2005/0059430 | A1* | 3/2005 | Beeman et al. ............... 455/558 |
| 2005/0083893 | A1* | 4/2005 | Purkayastha et al. ......... 370/338 |
| 2005/0083899 | A1 | 4/2005 | Babbar et al. |
| 2005/0102529 | A1* | 5/2005 | Buddhikot et al. ........... 713/200 |
| 2005/0111419 | A1* | 5/2005 | Kwon et al. ................... 370/338 |
| 2005/0130659 | A1* | 6/2005 | Grech et al. ................... 455/436 |
| 2005/0152396 | A1* | 7/2005 | Pichna et al. .................. 370/467 |
| 2005/0170852 | A1* | 8/2005 | Li et al. ...................... 455/456.5 |
| 2005/0254469 | A1* | 11/2005 | Verma et al. .................. 370/338 |
| 2005/0286466 | A1* | 12/2005 | Tagg et al. ..................... 370/329 |
| 2006/0004643 | A1 | 1/2006 | Stadelmann et al. |
| 2006/0246902 | A1* | 11/2006 | Back et al. .................... 455/436 |
| 2006/0291417 | A1 | 12/2006 | Aust et al. |
| 2007/0264994 | A1* | 11/2007 | Schwarz et al. ............ 455/422.1 |
| 2008/0274736 | A1* | 11/2008 | Hu ................................. 455/433 |

FOREIGN PATENT DOCUMENTS

| | | |
|---|---|---|
| EP | 1 213 941 | 6/2002 |
| JP | 09-289684 | 11/1997 |
| KR | 2000-0040492 | 7/2000 |
| KR | 2003-0037373 | 5/2003 |
| WO | 00/60895 | 10/2000 |
| WO | 01/11911 | 2/2001 |
| WO | 01/35585 | 5/2001 |
| WO | 01/39533 | 5/2001 |
| WO | 01/50790 | 7/2001 |
| WO | 01/095579 | 12/2001 |
| WO | 01/95579 | 12/2001 |
| WO | 02/01902 | 1/2002 |
| WO | 03/015444 | 2/2003 |
| WO | 04/077753 | 9/2004 |
| WO | 2004/077753 | 9/2004 |
| WO | 05/020619 | 3/2005 |
| WO | 2005/020619 | 3/2005 |

OTHER PUBLICATIONS

Shiao-Li Tsao; Chia-Ching Lin; Design and evaluation of UMTS-WLAN interworking strategies, Vehicular Technology Conference, 2002, Proceedings. VTC 2002—Fall. 2002 IEEE 56$^{th}$, vol. 2, Sep. 24-28, 2002 pp. 777-781.

Agharebparast, F; Leung, V.C.M.; QoS support in the UMTS/GPRS backbone network using DiffServ, Global Telecommunications Conference, 2002. GLOBECOM '02. ieee, vol. 2, Nov. 17-21, 2002 pp. 1440-1444.

3$^{rd}$ Generation Partnership Project, "Technical Specification Group Core Network; Mobile Radio Interface Layer 3 Specification; Core Network Protocols; Stage 3 (Release 6)", 3GPP TS 24.008, V6.2.0, Sep. 2003, pp. 399-407.

3GPP, "3$^{rd}$ Generation Partnership Project; Technical Specification Group Services and System Aspects; 3GPP System to Wireless Local Area Network (WLAN) Interworking; System Description (Release 6)," 3GPP TS 23.234 V2.0.0 (Sep. 2003).

3GPP, "3$^{rd}$ Generation Partnership Project; Technical Specification Group Services and System Aspects; 3GPP System to Wireless Local Area Network (WLAN) Interworking; System Description (Release 6)," 3GPP TS 23.234 V2.3.0 (Nov. 2003).

3GPP, "3$^{rd}$ Generation Partnership Project; Technical Specification Group Core Network; Mobile Radio Interface Layer 3 Specification; Core Network Protocols; Stage 3 (Release 1999)", 3GPP TS 24.008, V3.17.0 (Sep. 2003).

3GPP, "3$^{rd}$ Generation Partnership Project; Technical Specification Group Core Network; Mobile Radio Interface Layer 3 Specification; Core Network Protocols; Stage 3 (Release 4)", 3GPP TS 24.008, V4.12.0 (Sep. 2003).

3GPP, "3$^{rd}$ Generation Partnership Project; Technical Specification Group Core Network; Mobile Radio Interface Layer 3 Specification; Core Network Protocols; Stage 3 (Release 5)", 3GPP TS 24.008, V5.9.0 (Sep. 2003).

3$^{rd}$ Generation Partnership Project, "Technical Specification Group Core Network; Mobile Radio Interface Layer 3 Specification; Core Network Protocols; Stage 3 (Release 6)", 3GPP TS 24.008, V6.2.0 Sep. 2003, pp. 399-407.

Agharebparast, F; Leung, V.C.M.; QoS support in the UMTS/GPRS backbone network using DiffServ, Global Telecommunications Conference, 2002. GLOBECOM '2. ieee, vol. 2, Nov. 17-21, 2002, pp. 1440-1444.

Hongyang Bing; Chen He; Lingge Jiang; Performance analysis of vertical handover in a UMTS-WLAN integrated network, Personal, Indoor and Mobile Radio Communications, 2003. PIMRC 2003. 14$^{th}$ IEEE Proceedings on, vol. 1, Sep. 7-10, 2003, pp. 187-191.

Salkintzis, A.K.; Interworking between WLANs and third-generation cellular data networks, Vehicular Technology Conference, 2003. VTC 2003—Spring. The 57$^{th}$ IEEE Semiannual, vol. 3, Apr. 22-25, 2003 pp. 1802-1806.

Shiao-Li Tsao; Chia-Ching Lin; Design and evaluation of UMTS-WLAN interworking strategies, Vehicular Technology Conference, 2002. Proceedings. VTC 2002—Fall. 2002 IEEE 56$^{th}$, vol. 2, Sep. 24-28, 2002 pp. 777-781.

3GPP, "3$^{rd}$Generation Partnership Project; Technical Specification Group Services and System Aspects; 3GPP System to Wireless Local Area Network (WLAN) Interworking; System Description (Release 6)," 3GPP TS 23.234 V2.3.0 (Sep. 2003).

3GPP, "3$^{rd}$Generation Partnership Project; Technical Specification Group Services and System Aspects; 3GPP System to Wireless Local Area Network (WLAN) Interworking; System Description (Release 6)," 3GPP TS 23.234 V2.3.0 (Nov. 2003).

3GPP, "3$^{rd}$Generation Partnership Project; Technical Specification Group Core Network; Mobile Radio Interface Layer 3 Specification; Core Network Protocols; Stage 3 (Release 1999)", 3GPP TS 24.008, V4.12.0 (Sep. 2003).

3GPP, "3rd Generation Partnership Project; Technical Specification Group Core Network; Mobile Radio Interface Layer 3 Specification; Core Network Protools; Stage 3 (Release 4)", 3GPP TS 24.008, V4.12.0 (Sep. 2003).

3GPP, "3rd Generation Partnership Project; Technical Specification Group Core Network; Mobile Radio Interface Layer 3 Specification; Core Network Protools; Stage 3 (Release 5)", 3GPP TS 24.008, V4.12.0 (Sep. 2003).

3GPP, "3rd Generation Partnership Project; Technical Specification Group Services and System Aspects; General Packet Radio Service (GPRS); Service description; Stage 2 (Release 1999)," 3GPP TS 23.060 V3.15.0 (Jun. 2003).

3GPP, "3rd Generation Partnership Project; Technical Specification Group Services and System Aspects;General Packet Radio Service (GPRS); Service description; Stage 2 (Release 4), " 3GPP TS 23.060 V4.8.0 (Jun. 2003).

3GPP, 3rd Generation Partnership Project; Technical Specification Group Services and Systems Aspects; Network architecture (Release 4), 3GPP TS 23.002 V4.8.0 (Jun. 2003).

3GPP, 3rd Generation Partnership Project; Technical Specification Group Services and Systems Aspects; Network architecture (Release 6), 3GPP TS 23.002 V6.2.0 (Sep. 2003).

3GPP, "3rd Generation Partnership Project; Technical Specification Group Services and System Aspects; General Packet Radio Service (GPRS); Service description; Stage 3 (Release 6)," 3GPP TS 23.060 V6.2.0 (Sep. 2003).

3GPP, "3rd Generation Partnership Project; Technical Specification Group Services and Systems Aspects; Network architecture (Release 1999)," 3G TS 23.002 V3.6.0 (Sep. 2002).

3GPP, "3rd Generation Partnership Project; Technical Specification Group GSM/EDGE Radio Access Network; Overall description-Stage 2; (Release 6)," 3GPP TS 43.051 V6.0.0 (Nov. 2003).

3GPP, "3rd Generation Partnership Project; Technical Specification Group Services and Systems Aspects; Network architecture (Release 5)," 3GPP TS 23.002 V5.12.0 (Sep. 2003).

3GPP, "3rd Generation Partnership Project; Technical Specification Group GSM/EDGE Radio Access Network; Overall description-Stage 2; (Release 5)," 3GPP TS 43.051 V5.10.0 (Aug. 2003).

3GPP, "Technical Specification Group Services and System Aspects; General Packet Radio Service (GPRS); Service description; Stage 2 (Release 5), " 3GPP TS 23.060 V5.6.0 (Jun. 2003).

3rd Generation Partnership Project, "Technical Specification Group Core Network; Mobile Radio Interface Layer 3 Specification; Core Network Protocols; Stage 3 (Release 6)", 3GPP TS 24.008, V6.2.0, Sep. 2003, pp. 399-407.

Agharebparast, F; Leung, V.C.M.; QoS support in the UMTS/GPRS backbone network using DiffServ, Global Telecommunications Conference, 2002. Globecom '02. ieee, vol. 2, Nov. 17-21, 2002.

De Vriendt et al. "Mobile Network Evolution: A Revolution on the Move." IEEE Communications Magazine, Broadband Access Series, Issue 4, Apr. 2002, pp. 104-111.

Hongyang Bing; Chen He; Lingge Jiang; Performance analysis of vertical handover in a UMTS-WLAN integrated network, Personal, Indoor and Mobile Radio Communications, 2003. PIMRC 2003. 14th IEEE Proceedings on, vol. 1, Sep. 7-10, 2003, pp. 187-191.

Salkintzis, A.K.; Interworking between WLANs and third-generation cellular data networks, Vehicular Technology Conference, 2003. VTC 2003 —Spring. The 57th IEEE Semiannual, vol. 3, Apr. 22-25, 2003 pp. 1802-1806.

Shiao-Li Tsao; Chia-Ching Lin; Design and evaluation of UMTS-WLAN interworking strategies, Vehicular Technology Conference, 2002. Proceedings. VTC 2002-Fall. 2002 IEEE 56th, vol. 2, Sep. 24-28, 2002 pp. 777-781.

* cited by examiner

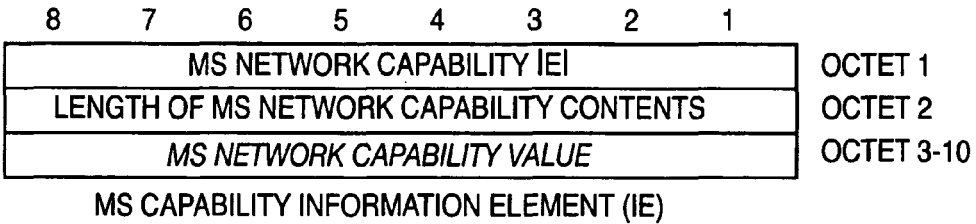

FIG. 3

```
<MS network capability value part> ::=

<GEA1 bits>
    <SM capabilities via dedicated channels: bit>
    <SM capabilities via GPRS channels: bit>
      <UCS2 support: bit>
    <SS Screening Indicator: bit string(2)>
    <SoLSA Capability : bit>
    <Revision level indicator: bit>
    <PFC feature mode: bit>
    <Extended GEA bits>
    < LCS VA capability: bit >
    <WLAN Capability: bit>
    <Spare bits>;

<GEA1 bits> ::= <GEA/1 :bit>;

LCS VA capability (LCS value added location request notification capability)
    0 LCS value added location request notification capability not supported
    1 LCS value added location request notification capability supported WLAN capability:
    0  WLAN capability not supported
    1  WLAN capability supported
```

FIG. 4A

NETWORK CAPABILITY IE

- EXISTING
- MS NETWORK CAPABILITY VALUE
  [24.008] :=<GEA1 BITS>
  1. <SM CAPABILITIES VIA DEDICATED CHANNELS: BIT>
  2. <SM CAPABILITIES VIA GPRS CHANNELS: BIT>
  3. <UCS2 SUPPORT: BIT>
  4. <SS SCREENING INDICATOR: BIT STRING(2)>
  5. <SoLSA CAPABILITY: BIT>
  6. <REVISION LEVEL INDICATOR: BIT>
  7. <PFC FEATURE MODE: BIT>
  8. <EXTENDED GEA BITS>
  9. <LCS VA CAPABILITY: BIT>
  10. <SPARE BITS>;

- NEW
- MS NETWORK CAPABILITY VALUE
  [24.008] :=<GEA1 BITS>
  1. <SM CAPABILITIES VIA DEDICATED CHANNELS: BIT>
  2. <SM CAPABILITIES VIA GPRS CHANNELS: BIT>
  4. <SMS CAPABILITY VIA WLAN: BITS>
  5. <SMS (TEXT ONLY, TEXT & ANIMATION), IMS, MMS, ETC.>
  6. <UCS2 SUPPORT: BIT>
  7. <SS SCREENING INDICATOR: BIT STRING(2)>
  8. <SoLSA CAPABILITY: BIT>
  9. <REVISION LEVEL INDICATOR: BIT>

*FIG. 4*

RADIO ACCESS CAPABILITY IE

EXISTING
- <MS RA CAPABILITY VALUE PART:= [24.008]
  1. <ACCESS TECHNOLOGY TYPE>
  2. <ACCESS CAPABILITIES : BIT>
  3. <UMTS FDD RADIO ACCESS TECHNOLOGY CAPABILITY : BIT>
  4. <UMTS 3.84 Mcps TDD RADIO ACCESS TECHNOLOGY CAPABILITY : BIT>
  5. < CDMA 2000 RADIO ACCESS TECHNOLOGY CAPABILITY : BIT>
  6. <UMTS 1.28 Mcps TDD RADIO ACCESS TECHNOLOGY CAPABILITY : BIT>

NEW
- <MS RA CAPABILITY VALUE PART:= [24.008]
  1. <ACCESS TECHNOLOGY TYPE>
  2. <ACCESS CAPABILITIES : BIT>
  3. <UMTS FDD RADIO ACCESS TECHNOLOGY CAPABILITY : BIT>
  4. <UMTS 3.84 Mcps TDD RADIO ACCESS TECHNOLOGY CAPABILITY : BIT>
  5. < WLAN RADIO ACCESS CAPABILITY : TERMINAL TYPE (PDA, LAPTOP, PHONE), MEMORY SIZE, SCREEN SIZE, PROCESSING POWER, TECHNOLOGY VERSION (802.11, 802.15, 802.16,...ETC.), SERVICE PROFILE (SMS (TEXT ONLY, TEXT & ANIMATION)), MMS, IMS, LOCATION, MBMS,...ETC.>

*FIG. 5*

| FIG. 5A1 |
|---|
| FIG. 5A2 |

FIG. 5A

```
<MS RA capability value part ; <MS RA capability value part struct>>
<spare bits>**; -- available for future enhancements <MS RA capability value part struct> ::=  -- recursive structure allows any number of Access technologies
    {       < Access Technology Type : bit (4) > exclude 1111
            < Access capabilities ; <Access capabilities struct> > }

{       < Access Technology Type : bit (4) = 1111 >    -- structure adding Access
            < Length : bit (7) >                           -- length in bits of list of Additional access technologies
technologies with same capabilities
            { 1 < Additional access technologies: < Additional access technologies struct > > }; ** 0
and spare bits
                <spare bits>**; } }

{ 0 | 1 <MS RA capability value part struct> } ;

< Additional access technologies struct > ::=
    < Access Technology Type : bit (4) >
    < GMSK Power Class : bit (3) >
    < 8PSK Power Class : bit (2) > ;

< Access capabilities struct > ::=
    < Length : bit (7) >        -- length in bits of Content and spare bits
    <Access capabilities : <Content>>
    <spare bits>**;   -- expands to the indicated length
                      -- available for future enhancements
```

FIG. 5A1

```
< Content > ::=
    < RF Power Capability : bit (3) >
    { 0 | 1 < A5 bits : < A5 bits >> }    -- zero means that the same values apply for parameters as in the
immediately preceding Access capabilities field within this IE
    < ES IND : bit >
    < PS : bit >
    < VGCS : bit >
    < VBS : bit >
    { 0 | 1 < Multislot capability : Multislot capability struct > } -- zero means that the same values for multislot
parameters as given in an earlier Access capabilities field within this IE apply also here
-- Additions in release 99
    { 0 | 1 < 8PSK Power Capability : bit(2) > } -- '1' also means 8PSK modulation capability in the uplink.
    < COMPACT Interference Measurement Capability : bit >
    < Revision Level Indicator : bit >
    < UMTS FDD Radio Access Technology Capability : bit >
    < UMTS 3.84 Mcps TDD Radio Access Technology Capability : bit >     -- 3G RAT
    < CDMA 2000 Radio Access Technology Capability : bit >              -- 3G RAT
-- Additions in release 4
    < UMTS 1.28 Mcps TDD Radio Access Technology Capability : bit >     -- 3G RAT
    < GERAN Feature Package 1 : bit >
    { 0 | 1 < Extended DTM GPRS Multi Slot Class : bit(2) >
            < Extended DTM EGPRS Multi Slot Class : bit(2) > }
    < Modulation based multislot class support : bit >
-- Additions in release 5
    { 0 | 1 < High Multislot Capability : bit(2) > }
    < GERAN Iu Mode Capability : bit >
    { 0 | 1   < GMSK_MULTISLOT_POWER_PROFILE : bit (2) >
              < 8-PSK_MULTISLOT_POWER_PROFILE : bit (2) > };
-- Additions in release 6
    < WLAN 802.xx Radio Access Technology Capability : bit(3) >
```

FIG. 5A2

```
DTM GPRS Multi Slot Class (2 bit field)
This field indicates the DTM GPRS multislot capabilities of the MS. It is coded as follows:
Bits
2 1
0 0        Unused. If received, the network shall interpret this as '01'
0 1        Multislot class 5 supported
1 0        Multislot class 9 supported
1 1        Multislot class 11 supported

.....

UMTS FDD Radio Access Technology Capability (1 bit field)
Bit
0          UMTS FDD not supported
1          UMTS FDD supported UMTS 3.84 Mcps TDD Radio Access Technology Capability (1 bit field)
Bit
0          UMTS 3.84 Mcps TDD not supported
1          UMTS 3.84 Mcps TDD supported CDMA 2000 Radio Access Technology Capability (1 bit field)
Bit
0          CDMA 2000 not supported
1          CDMA 2000 supported UMTS 1.28 Mcps TDD Radio Access Technology Capability (1 bit field)
Bit
0          UMTS 1.28 Mcps TDD not supported
1          UMTS 1.28 Mcps TDD supported WLAN 802 Radio Access Technology Capability (3 bit field)
Bits
000    WLAN 802.xx not supported
001    WLAN 802.11b supported
010    WLAN 802.11a supported
011    WLAN 802.16 supported

---------------------------------------------------------------

GERAN Feature Package 1 (1 bit field)
This field indicates whether the MS supports the GERAN Feature Package 1 (see 3GPP TS 44.060).
It is coded as follows:

0          GERAN feature package 1 not supported.
1          GERAN feature package 1 supported.
```

*FIG. 5B*

METHOD AND APPARATUS FOR REPORTING WLAN CAPABILITIES OF DUAL MODE GPRS/WLAN OR UMTS/WLAN WTRU

CROSS REFERENCE TO RELATED APPLICATION(S)

This application is a continuation of application Ser. No. 10/750,193 filed Dec. 31, 2003, which claims priority from U.S. Provisional Application No. 60/512,164 filed on Oct. 17, 2003, which is incorporated by reference as if fully set forth herein.

FIELD OF INVENTION

The present invention relates to WTRUs having dual-mode capabilities and more particularly to method and apparatus for reporting dual mode capabilities and for reporting availability of network interworking.

BACKGROUND

The current developments of wireless local area network (WLAN) interworking with general packet radio service/universal mobile telecommunications system/third generation (GPRS/UMTS/3G) networks has resulted in products that include two radio units in a common enclosure (e.g., cards supporting 802.11b+GPRS air interfaces and 802.11b+ UMTS air interfaces). The units may be separate cards or may be integrated onto one common card.

Hereafter a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Currently the network may not be aware of the dual-mode capabilities of the terminal. In addition, the offered services may change dramatically based on the terminal capabilities in terms of processing power, memory availability, screen size, bit rate, etc. For example, a dual mode 802+GPRS personal digital assistant (PDA) may be able to receive short message service (SMS) or multimedia message service (MMS) messages over a GPRS or an 802 network, however, several variations of these services may be provided in accordance with allotted memory space of the wireless terminal. Rich multimedia services may require larger memory size than that available in the PDA. Therefore, the same multimedia services may be provided via black and white or a reduced set of colors depending on terminal capabilities. Also, the possibility of network-assisted handoff can be provided to those terminals that indicate dual mode (WLAN/GPRS or WLAN/ 3G) capabilities. A mechanism is needed to indicate these capabilities to the existing GPRS/UMTS networks.

In addition, in network interworking, there is no capability of informing a wireless terminal having dual-mode radio capabilities and relying upon one of the networks with which it communicates to be advised of the interworking capability to enable the wireless terminal to have the increased ability of communicating with either of the two networks.

SUMMARY

The present invention is characterized by comprising a method and apparatus for enabling a wireless terminal to communicate the dual-mode capabilities and further to provide a method and apparatus for reporting the interworking capabilities of the two networks wherein the wireless terminal has the added capability of obtaining services from either one of the interworking networks.

BRIEF DESCRIPTION OF THE DRAWING(S)

The present invention will be understood from a consideration of the figures in which like elements are designated by like numerals and, wherein:

FIG. 3 shows a WTRU network capability information element (IE).

FIGS. 4 and 5 respectively show the existing and modified network capability and radio access (RA) capability information element (IE).

FIG. 4A shows the modified network capabilities IE of FIG. 4 in greater detail.

Figure 1:
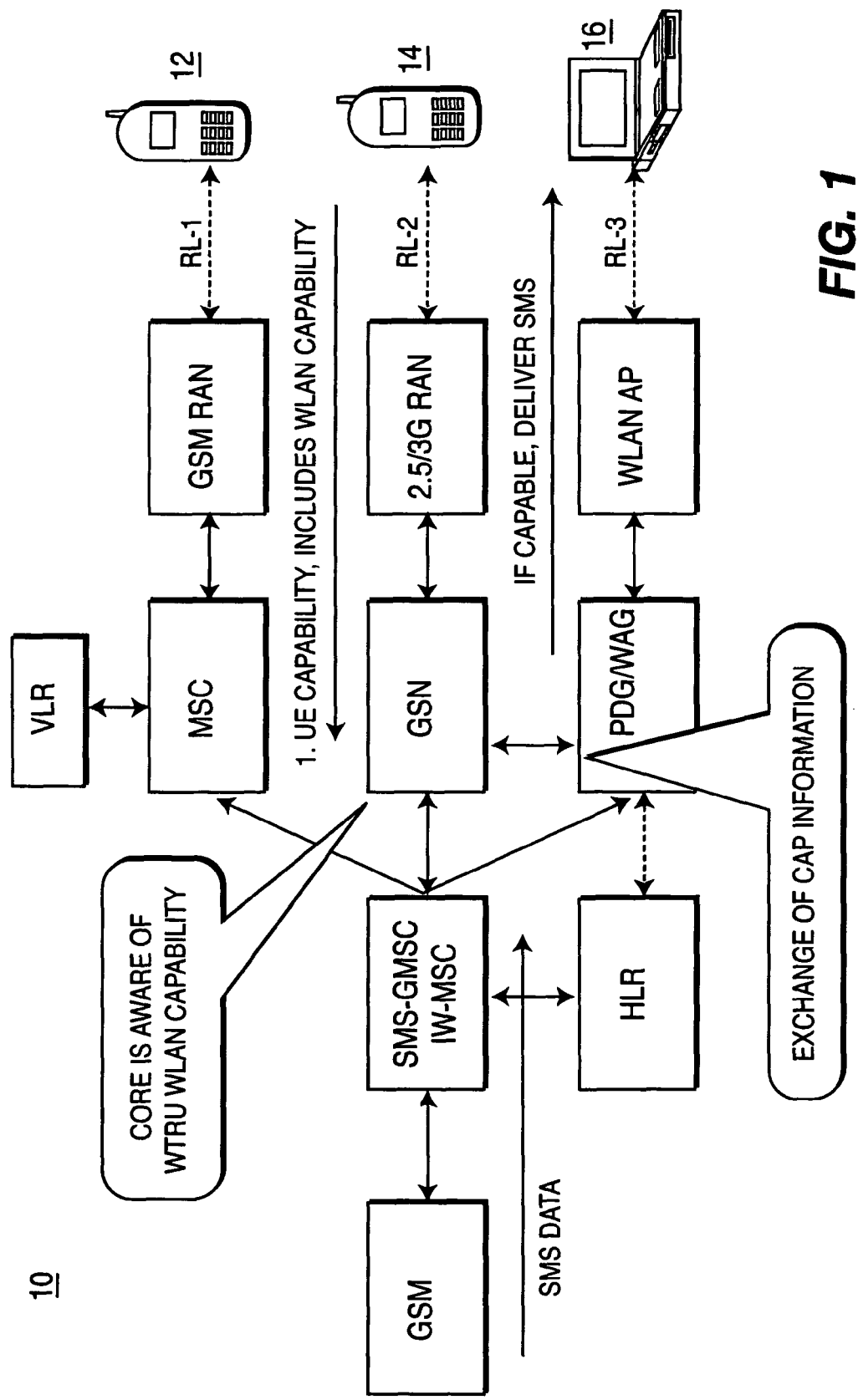
FIG. 1 is a simplified schematic diagram of the network having integrated universal mobile telephone service (UMTS) and wireless local area network (WLAN) networks.
Figure 2:
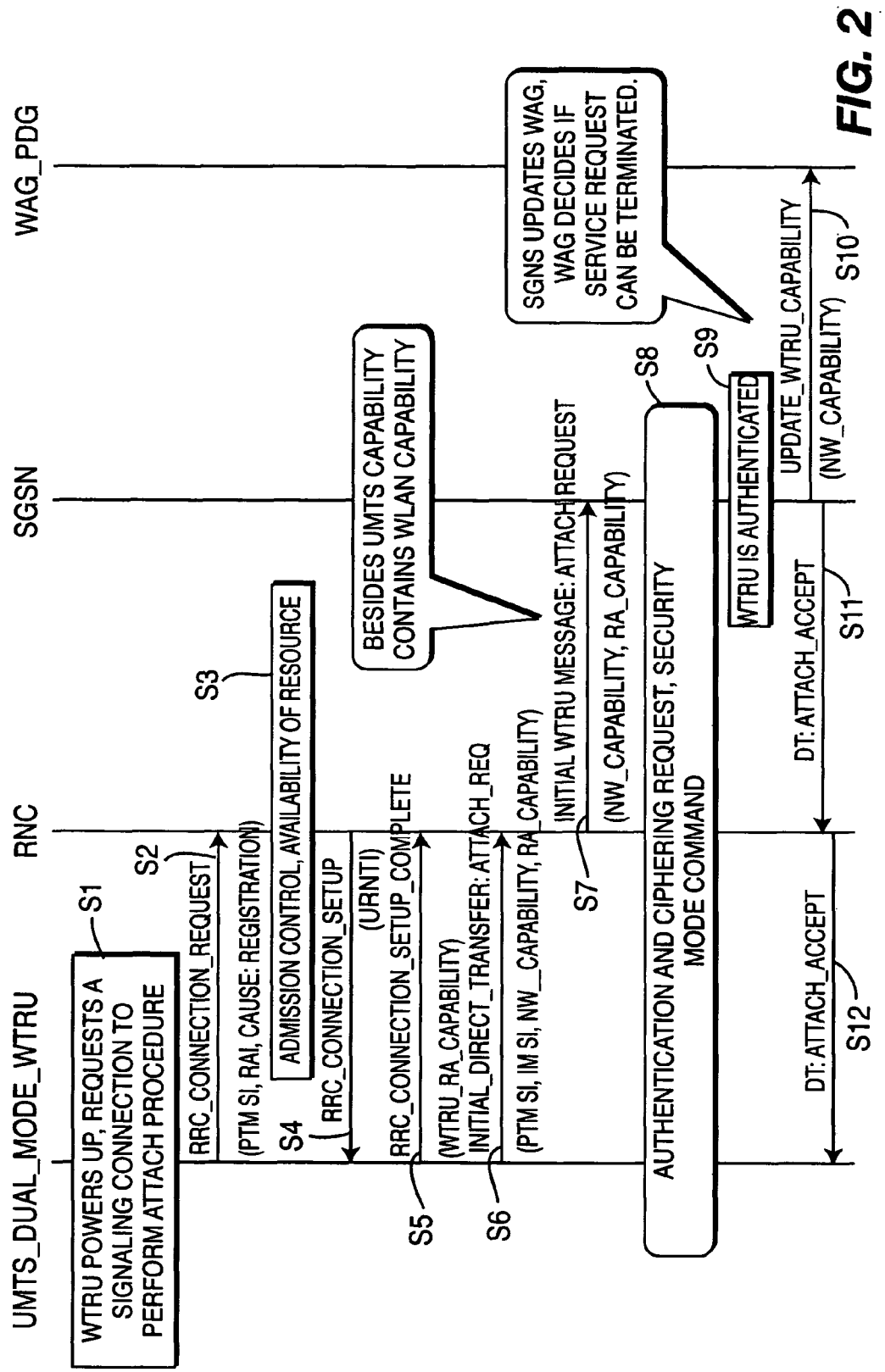
FIG. 2 is a simplified schematic diagram showing an attached procedure and embodying the capabilities of the present invention.

FIGS. 5A1-5A2 and 5B show the modified RA capability IE of FIG. 5 in greater detail and FIG. 5A shows the manner in which FIGS. 5A1 and 5A2 are arranged.

DETAILED DESCRIPTION OF THE PREFERRED EMBODIMENT(S)

The problem solved by this invention is the mechanism by which a terminal that supports both GPRS and WLAN, or 3G and WLAN can report its WLAN capabilities to the supporting GPRS/UMTS networks. Also, the invention identifies the mechanism by which a 3G network can indicate that 3G or packet switched domain services over WLAN are available.

FIG. 1 shows a simplified block diagram of a network in which a UMTS and a WLAN are integrated. The WTRUs 12, 14 and 16 communicate with the network over respective radio links (RL-1, RL-2 and RL-3). More particularly, WTRU 12 communicates with a GSM radio access network (RAN); WTRU 14 communicates with a 2.5/3G RAN and WTRU 16 communicates with a WLAN access point (AP). WTRUs 12 and 14 may be cellular telephones while WTRU 16 may be a laptop, personal digital assistant (PDA) or other like device having an appropriate card enabling communication with the WLAN AP.

The GSM RAN communicates with a mobile switching center (MSC) which, as is known in the art, has the capability of interworking with location data bases. The MSC communicates with the visitor location register (VLR) to identify, authenticate, etc. the WTRU 12. The MSC also communicates with the short message service-gateway mobile switching center/interworking-mobile switching center (SMS-GMSC/IW-MSC) which provides the services such as short message service (SMS) data. The home location register (HLR) is a data base within the home public land mobile network (HPLMN) providing routing information for mobile terminated calls and SMS data and is also responsible for maintenance of user subscription information distributed to the relevant VLR (note the VLR in FIG. 1) or GSN (GPRS support node) through the attached process and mobility management procedures such as location area and routing area updates.

The WLAN AP communicates with a packet data gateway/ WLAN access gateway (PDG/WAG). Capability information is exchanged between the GSN and the PDG/WAG. Services such as SMS data services are communicated to the PDG/WAG and hence to the WTRU 16 by way of the PDG/WAG and WLAN AP. Based on the capability of the WTRU 16, SMS data may be delivered thereto.

The WTRUs 12 and 14 when respectively communicating with the network through their associated RAN, provide information regarding their capability which, in accordance with the present invention, includes WLAN compatibility.

FIG. 2 shows an attached procedure combined with a WLAN capability update. In the procedure shown in FIG. 2, a UMTS dual mode WTRU, at step S1, powers up for a signaling connection to perform the ATTACH procedure. At step S2, a radio resource control (RRC) connection request message is conveyed to the radio network controller (RNC). Admission control and availability of resources is performed by the RNC, at step S3, which then conveys an RRC connection setup message to the dual mode WTRU, at step S4. The WTRU, at step S5, provides an RRC connection set up complete message providing the WTRU radio access (RA) compatibility and, at step S6, provides the initial direct transfer message, which includes the attached request and the point-to-multipoint system information (PtM SI), instant messaging system information (IM SI), network (NW) capability and radio access (RA) capability. The RNC, at step S7, provides an initial WTRU Message: attach request including the network and radio access capabilities. In addition to the UMTS capabilities, the message further contains WLAN capability. At step S8, authentication and ciphering request and security mode commands are performed and the WTRU is authenticated, at step S9. Thereafter, the SGSN provides a WTRU capability update to the WAG-PDG, at step S10, and provides an attach-accept message to the RNC, at step S11, which is then conveyed, at S12, to the WTRU.

The update of the WTRU capability sent to WAG-PDG, at step S10, causes the SGSN to update the WAG, which may then decide if the service request can be terminated.

The purpose of a mobile station WTRU network capability information element is to provide the network with information concerning aspects of the WTRU related to the GPRS. The contents of the information element can affect the manner in which the network handles the operation of the WTRU. WTRU network capability information indicates general WTRU characteristics and, except for fields explicitly indicated, is independent of the frequency band of the sending channel.

WTRU network capability is a type 4 information element (IE) having a maximum length of ten octets.

The value part of the WTRU network capability IE is coded, as shown in FIG. 3.

FIG. 4 is a comparison of the existing network capability IE with the network capability information element of the present invention and FIG. 5 shows a comparison of the radio access capability information element (RAC IE) with the RAC IE of the present invention.

The purpose of the mobile station (MS) network capability IE is to provide the network with information concerning aspects of the mobile station (i.e., WTRU) related to GPRS. The contents can affect the manner in which the network handles the operation of the mobile station. The MS network capability information indicates general mobile station characteristics and except for fields explicitly indicated, is independent of the frequency band of the channel it is sent on. The MS network capability is a type 4 information element with a maximum of ten octets length. The value part of a MS network capability information element is coded as shown in FIG. 3.

Making reference to FIG. 4, which shows the network capability IE in amplified fashion, item (1) of both the existing and new IE, namely the system management capabilities by way of dedicated channels, are the same. Item (2) listed in the existing and new IE, the system management capabilities by way of GPRS channels are the same. Item (3) in the existing IE, and item (6) in the new information element, the Universal Multiple—Octet Coded Character Set (UCS), USC2 16 bit coding support, are the same.

Item (4) in the existing IE and item (7) in the new IE, i.e. the supplementary service screening indicator, are the same. The support of localized service area (SoLSA) capability, item (5) of the existing IE and item (8) of the new IE, are the same.

Item (6) in the existing IE, the revision level indicator, is the same as item (9) in the new IE. Items (4) and (5) in the new IE, namely, the system management capability by way of the WLAN and the short message system (SMS) item which identifies text only, text and animation, the instant message service and the multimedia service as well as others are provided to the WTRU, are not provided in the existing IE. Items (7) through (10) of the existing IE are omitted from the new IE and will not be discussed herein for simplicity.

FIG. 4A shows the network capability IE in greater detail. For example, as shown in FIG. 4A, the location service (LCS) value added (VA) location request notification bit, (in binary format) is "0" when not supported and is "1" when supported. WLAN capability is supported when its binary bit is "1" and is not supported when in the "0" state. The bit or bits identifying each capability are assigned predetermined locations with the IE. This is also the case for the RA capabilities. Also note that the GPRS encryption algorithm (GEA) capability bit is "0" when not supported and "1" when supported.

The purpose of the mobile station radio access (MS RA) capability information element (IE) is to provide the radio part of the network with information concerning radio aspects of the mobile station (i.e., the WTRU). The contents can affect the manner in which the network handles the operation of the mobile station. The MS RA capability is a type 4 information element, with a maximum length of 52 octets. The value part of a MS RA capability information element is coded as shown in FIGS. 5A and 5B.

FIG. 5 compares the existing and new radio access capability IEs. Items (1) through (4) of the existing IE, namely the access technology type, access capabilities, UMTS FDD RA technology capability and UMTS 3.84 Mcps TDD RA technology capability, are identical to the items (1) through (4) in the new IE.

Items (5) and (6) in the existing IE are omitted from the new IE and hence will not be discussed herein for purposes of simplicity. Item (5) of the new IE does not appear in the existing IE and provides WLAN radio access capability which identifies the type of remote terminal, (such as PDA, laptop, phone, etc.), memory size, screen size, processing power, technology version (such as 802.11, 802.15, 802.16 and so forth), service profile, (such as SMS text only or text and animation), MMS, IMS, location, MBMS, and the like.

FIGS. 5A1-5A2/5B show the MS RA capability IE in greater detail. In FIGS. 5A1-5A2, the Access Technology type of four binary bits, represents the technology type used for access. Gaussian minimum shift keying (GMSK) is a form of frequency shift keying providing good spectral efficiency. 8PSK is a modulation technique where the carrier exists in one of eight states. FIG. 5B shows the fields and binary dates for identifying some of the capabilities. For example, a three bit field is used to identify WLAN 802 RA Technology wherein the technology supported is identified by a particular combination of binary bits. Note that no support of WLAN 80.xx technology is represented by "000," support for WLAN 802.11b technology represented by "001" and so forth. As another example, the CDMA 2000 RA Technology capability is "0" when not supported and "1" when supported.

A dual mode WTRU provides a WLAN capability report over its UMTS (or GPRS) network depending on whether the dual mode WTRU has WLAN/UMTS or WLAN/GPRS capability.

As shown in FIG. 2, when the WTRU is powered up, it first communicates by way of the UMTS channels and performs a non-access stratum (NAS) "ATTACH" procedure whereupon the UMTS/WLAN capability is exchanged with the network, as shown in FIG. 2.

Depending on implementation, the user may chose to continue communicating with the UMTS network, manually switch over to WLAN channels or perform an automatic handover to the WLAN network, if available.

The present invention thus introduces two new IEs to existing GPRS/UMTS capability messages between WTRU and network and network and WTRU. The radio access capability information element (RAC IE) is modified to inform the network about the dual-mode capabilities of the WTRU/card, i.e., GPRS+WLAN or UMTS/WLAN. The radio access capability (RAC), carries all aspects of the WLAN capabilities including terminal type, (such as PDA, laptop, cell phone), memory size, screen size, processing power, technology version (such as 802.11, 802.15, 802.16 and so forth), service profile (such as SMS text only or text and animation), SMS, MMS, IMS, location, multicast broadcast media service (MBMS) and so forth. The WLAN capability update procedures are achieved without modification of the existing "ATTACH" procedure. The network capability is modified to inform dual mode WTRUs regarding the existence of WLAN interworking capabilities and the different types of services that can be provided over a WLAN network.

What is claimed is:

1. A method for use in a wireless transmit/receive unit (WTRU), the method comprising:
    generating an attach request message that indicates a request to attach to a cellular core network and that includes a capability indicator that indicates whether the WTRU is capable of receiving services from the cellular core network via a wireless local area network (WLAN);
    communicating the attach request message to a network node in the cellular core network; and
    receiving services via the network node based on the capability indicator.

2. The method of claim 1, wherein the services are received via a cellular radio access network.

3. The method of claim 2, wherein the cellular radio access network is based on GSM or UMTS technology.

4. The method of claim 1, wherein the capability indicator is a radio access capability information element or a mobile station (MS) network capability information element.

5. The method of claim 1, wherein the services are received via a wireless local area network (WLAN).

6. The method of claim 5, further comprising:
    receiving a Short Message Service (SMS) message via the WLAN.

7. The method of claim 1, further comprising:
    receiving an acknowledgement of the attach request message from the network node.

8. A wireless transmit/receive unit (WTRU) comprising:
    a processor configured to generate an attach request message that indicates a request to attach to a cellular core network and that includes a capability indicator that indicates whether the WTRU is capable of receiving services from the cellular core network via a wireless local area network (WLAN);
    a transmitter configured to transmit the attach request message to a network node in the cellular core network; and
    a receiver configured to receive services via the network node based on the capability indicator.

9. The WTRU of claim 8, wherein the receiver is configured to receive the services via a cellular radio access network.

10. The WTRU of claim 9, wherein the cellular radio access network is based on GSM or UMTS technology.

11. The WTRU of claim 8, wherein the capability indicator is a radio access capability information element or a mobile station (MS) network capability information element.

12. The WTRU of claim 8, wherein the services are received via a WLAN.

13. The WTRU of claim 12 wherein the receiver is further configured to receive a Short Message Service (SMS) message via the WLAN.

14. The WTRU of claim 8, wherein the receiver is further configured to receive an acknowledgement of the attach request message from the network node.

* * * * *